United States Patent [19]

Steuer

[11] 3,875,814

[45] Apr. 8, 1975

[54] DEVICE FOR GENERATING VARIABLE PRESSURE FORCES IN REGULATABLE GEARING

[75] Inventor: Herbert Steuer, Bad Homburg, Germany

[73] Assignee: P.I.V. Antrieb Werner Reimers Kommanditgesellschaft, Bad Homburg, Germany

[22] Filed: Mar. 7, 1973

[21] Appl. No.: 338,917

[30] Foreign Application Priority Data
Apr. 20, 1972 Germany.......................... 2219238

[52] U.S. Cl. .................. 74/194; 74/196; 74/197; 74/230.17 M
[51] Int. Cl... F16h 15/08; F16h 15/10; F16h 15/20
[58] Field of Search ............ 74/194, 196, 197, 200, 74/230.17 M

[56] References Cited
UNITED STATES PATENTS

| | | | |
|---|---|---|---|
| 1,433,071 | 10/1922 | Cook | 74/197 |
| 1,981,910 | 11/1934 | Ehrlich | 74/196 |
| 2,057,482 | 10/1936 | Erban | 74/196 |
| 2,953,933 | 9/1960 | Kashiwara | 74/194 |
| 2,959,063 | 11/1960 | De Brie Perry | 74/200 |
| 3,164,025 | 1/1965 | Francisco, Jr. | 74/200 |
| 3,397,587 | 8/1968 | Saussele | 74/200 |

Primary Examiner—Samuel Scott
Assistant Examiner—Allan R. Burke

[57] ABSTRACT

In an infinitely variable transmission with torque transmitting elements, an arrangement is provided for producing shifting of one of the frictional members in accordance with the torque. The arrangement is allowed to slip in order to prevent the exertion of overpressure by limiting the movement of the part which is shifted in dependence on the torque.

6 Claims, 4 Drawing Figures

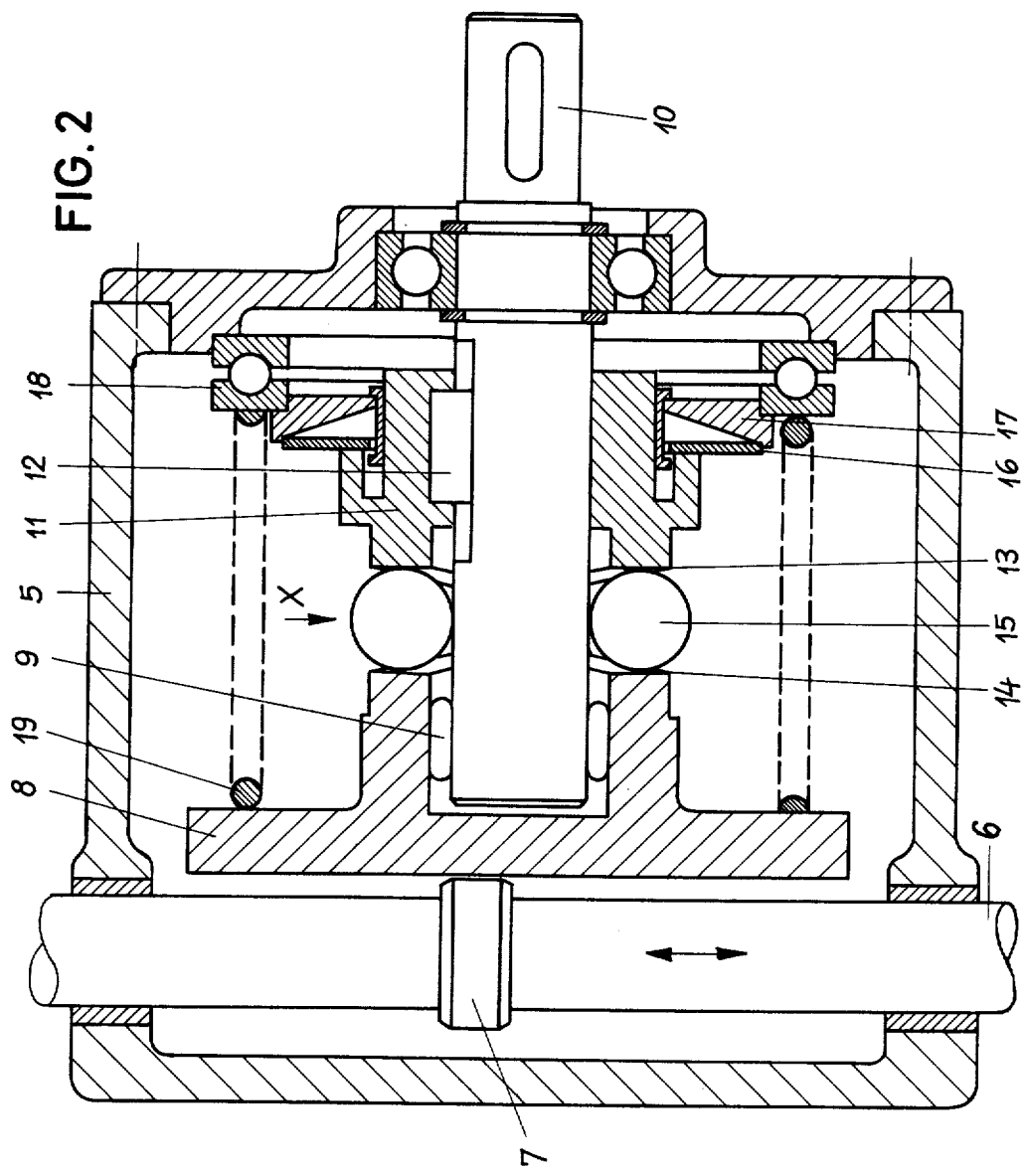

DEVICE FOR GENERATING VARIABLE PRESSURE FORCES IN REGULATABLE GEARING

BACKGROUND OF THE INVENTION

1. Field of the Invention

The invention relates to a device for generating variable pressure forces between torque-transmitting friction elements in steplessly adjustable gearings, where at least one body shifting in dependence on the torque delivers the pressure forces.

2. The Prior Art

Most stepless mechanical transmissions are so-called friction gearings which transmit power by an appropriate arrangement of friction elements (pulleys, wheels, rings, balls, drive belts or chains and the like) by means of force-engaging connection of these parts. In such transmissions a certain slip between the driving and driven shafts is not completely avoidable. In the interests of good efficiency this slip should be as slight as possible. In order to achieve this, the stepless friction transmissions are equipped with a pressing device which in the simplest case can be a spring.

While spring pressure is a constructionally simple and cheap solution, it has the disadvantage that the pressure force is constant independently of the transmission ratio of the gearing. In this case the spring force, in order to be able to transmit the rated power reliably, must lie somewhat above the corresponding value for the rated load. Thus an unnecessarily high pressure occurs in the partial load range and thus a poorer partial load efficiency. The same also applies to a spring force dependent upon the transmission ratio in each case, such as can be present for example in cone pulley-belt transmissions. This constructional arrangement also produces over-pressure in a specific transmission ratio range, for example in the neighborhood of $u_{min.}$ or $u_{max.}$. By the use of springs with non-linear characteristics, attempts are made to diminish this disadvantage.

If now a spring-pressed friction transmission is loaded beyond the torque corresponding to the pressure force, the drive mechanism commences to slip at the point of frictional transmission. In the case of appropriate formation of the frictional contact faces and by the use of suitable oils (for example in the case of all-steel transmissions) this slip, since in practice it occurs only briefly, is withstood without appreciable wear. Such transmissions are therefore expediently used at the same time as a stepless drive element and as a protective clutch for delicate machine parts, for example if there is fear of heavy starting surges in electric motors or if great masses have to be accelerated.

If however higher requirements are made as regards the efficiency and the transmittable specific power, such spring pressure is unsatisfactory for the above-mentioned reasons. Here so-called torque-dependent pressure devices are used. These are known in various forms, according to the construction of the gearing with which they are used.

Thus for example in the case of cone pulley-belt transmissions and in numerous friction wheel transmissions it is known to convert the torque occurring in the drive-input and/or drive-output shaft through balls and oblique ramp surfaces into axially directed pressure forces which are proportional to the torque transmitted in each case.

The torque-proportional pressure has the advantage over spring pressure that an extensive adaptation of the pressure forces to the values necessary for satisfactory energy transmission is ensured. Thus on the one hand over-pressure in the partial load range and on the other hand slipping of the transmission at full load are avoided. However disadvantages arise if transmissions with torque-proportional pressure are subjected to load surges lying far above the rated load, for example if, in starting up with electric motors, starting surges occur with up to five times the rated load. The increase of pressure forces involved under such conditions loads the transmission parts very heavily and these must be over-dimensioned for such overload conditions. Above a specific limit, slipping movements occur after all, which then cause considerable wear (pitting, seizing phenomena) and finally lead to the destruction of the transmissions. The frictional energy which occurs in this case reaches five to ten times the value in comparison with the rated load.

SUMMARY OF THE INVENTION

On the basis of the above-mentioned pressure devices, which are all based upon the common principle that a body shifting in dependence on the torque delivers the desired pressure force, the problem is solved in accordance with the invention in limiting the shifting of this body by stops. Thus in a surprisingly simple manner the advantages of spring-dependent pressure and of torque-dependent pressure can be combined with one another without at the same time having to accept their disadvantages. The stops can be rigidly or elastically formed and can act directly upon the shifting body or upon transmission members which bring about the shift.

Applying the principle in accordance with the invention to those pressure devices where the pressure forces act axially upon a displaceably and rotatably mounted friction disc which bears with its collar, having oblique end faces, through rolling bodies on correspondingly oblique counter-faces of a sleeve connected fast in rotation with the drive-input or drive-output shaft, it represents an especially simple and expedient solution if the oblique end faces comprise stops for the limitation of the relative rotation between the friction disc and sleeve. If the friction disc cooperates with a relatively inelastic friction wheel, it is expedient that the sleeve also is axially displaceably mounted on the drive-input or drive-output shaft, and that it bears through a dished spring on the housing or parts connected therewith. Because of the yielding of the dished spring on an increase of torque, the relative movement between the friction disc and sleeve is increased and the precise limitation of this relative movement by the stops is facilitated. The dished spring is expediently designed for a load lying slightly above the rated movement.

Of course it is also possible to form the friction disc as the cone pulley of a cone pulley-belt transmission.

BRIEF DESCRIPTION OF THE DRAWINGS

Further advantages and features of the object of the invention appear from the following description of examples of embodiment with reference to drawings, wherein:

FIG. 2 shows an axial section through a steplessly variable friction wheel gearing with torque-dependent pressure and limitation of the pressure force in accordance with the invention;

FIG. 3 shows the view in the direction X of the pressure device in FIG. 2 in the working position.

DESCRIPTION OF THE PREFERRED EMBODIMENT

Figure 1:
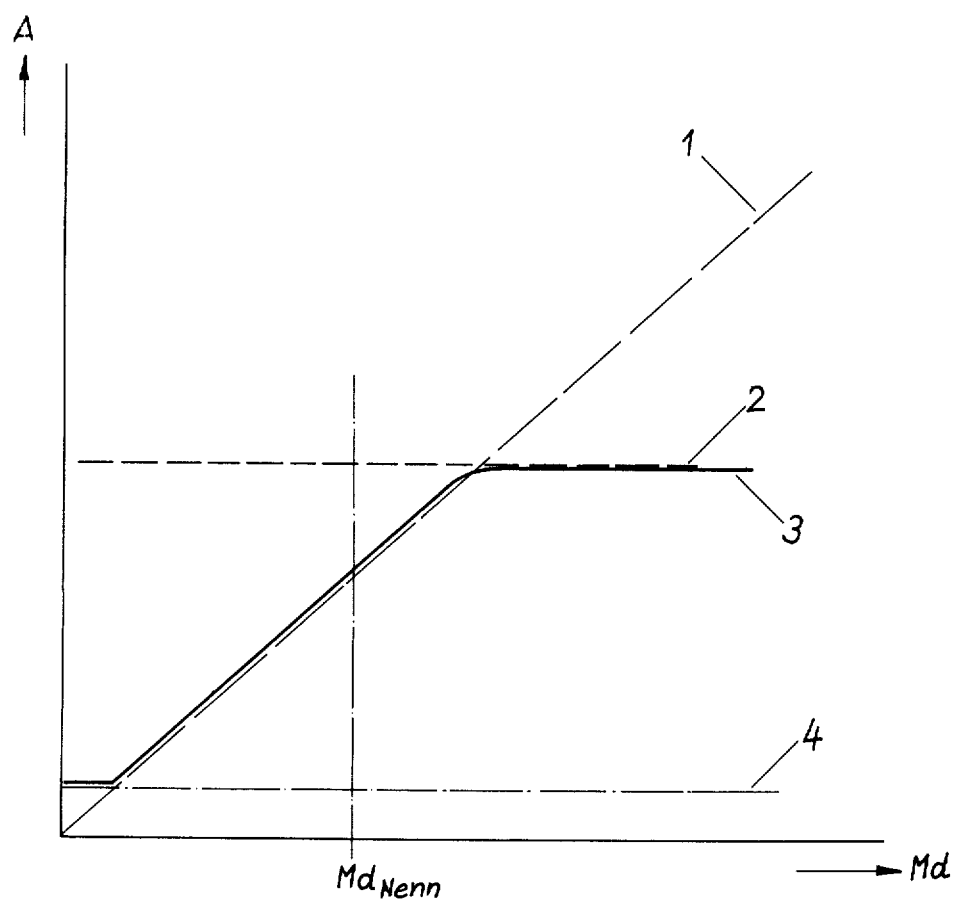
FIG. 1 shows the course of the pressing force in dependence upon the transmitted torque.

In FIG. 1 the pressure force A is represented in dependence upon the transmittable torque M$d$ for different kinds of pressure. The line 1 shows the association of pressure force and torque in the case of torque-proportional cam-sleeve pressure, the line 2 in the case of spring pressure and the line 3 in the case of pressure in accordance with the invention. The line 4 characterizes the constant initial pressure in idling, necessary in the case of torque-dependent pressure.

It may be seen clearly that the pressure force in the case of the torque-dependent pressure according to line 1, in contrast to spring pressure, even on overloading of the gearing beyond the rated moment continues to rise, so that the slipping movements occurring on heavy overloading cause considerable wear. On the other hand line 2 shows the constant course of the pressure force, independent of the transmitted torque, in the case of spring pressure, where the disadvantage of over-pressure occurs in the partial load range. Both disadvantages are avoided by the pressing device according to the invention, in that the pressure force initially increases in proportion to torque up to a value lying somewhat above the rated load, and on further increase of torque remains limited to a constant value.

The application of the principle according to the invention is explained in FIGS. 2 and 3 by way of example in the case of a pressure device by means of cam sleeves. In a housing 5 a shaft 6 with a friction wheel 7 is rotatably and axially displaceably mounted. The friction wheel 7 is in frictional connection with a crown wheel 8, which is rotatably seated by means of needle bearings 9 on a shaft 10, which in turn is rotatably mounted in the housing 5. Moreover on the shaft 10 there is seated a sleeve 11 which is arranged fast in rotation but is axially displaceable on the shaft by means of a key 12. This sleeve 11 has, just like the crown wheel 8, oblique ramp faces 13 and 14 respectively on its end face, which ramp faces are in connection with one another through balls 15. On its outer periphery the sleeve 11 bears on the inner edge of a dished spring 16, the outer ring of which bears in turn through a base ring 17 and a ball bearing 18 on the housing 5. An initial stressing spring 19 is arranged between the ball bearing 18 and the crown wheel 8. As FIG. 3 shows, the ramp surfaces 13 and 14 are limited by stops 20 and 21 respectively.

The manner of operation is as follows:

The torque introduced for example through the axially displaceable shaft 6 is transmitted by the friction wheel 7 by frictional engagement to the crown wheel 8. Through the balls 15 the force flux passes into the sleeve 11 and thence through the key 12 into the drive output shaft 10. In the transmission of the torque from the crown wheel 8 to the sleeve 11, axial forces are generated at the points of contact of the oblique ramp surfaces 13 and 14 with the balls 15, which forces effect a torque-proportional pressure of the crown wheel 8 on the friction wheel 7. If the axial force resulting from the torque exceeds a predetermined value, then the dished spring 16, set to this value, is over-pressed. Then the oblique ramp surfaces 13 and 14 rotate so far in relation to one another that the balls 15 come to abut for example on the stops 20, 21. The connection between the crown wheel 8 and the sleeve 11 now no longer takes place by frictional engagement through the ramp surfaces 13 and 14, but nearly positively through the stops 20 and 21. The pressure force is applied by the dished spring 16 and can be less than the initially stressed value in the end position, for example if a dished spring with a degressive characteristic is used. Since the pressure force thus produced no longer suffices for simultaneous transmission, the transmission slips at the frictional engagement point and acts like a slipping clutch.

The supporting of the dished spring 16, which takes place according to FIG. 2 through the bearing 18 on the housing 5, can be simplified in that instead a correspondingly formed hub is non-displaceably arranged on the shaft 10.

As a constructional variant to FIG. 2, in specific cases a cam-sleeve pressure is conceivable in which the ramp surfaces 13 and 14 bear directly against one another without interposition of balls. The pertinent stops can then be formed for example by two over-lapping noses on the one side and pins cooperating therewith on the other side of the sleeves.

Figure 4:
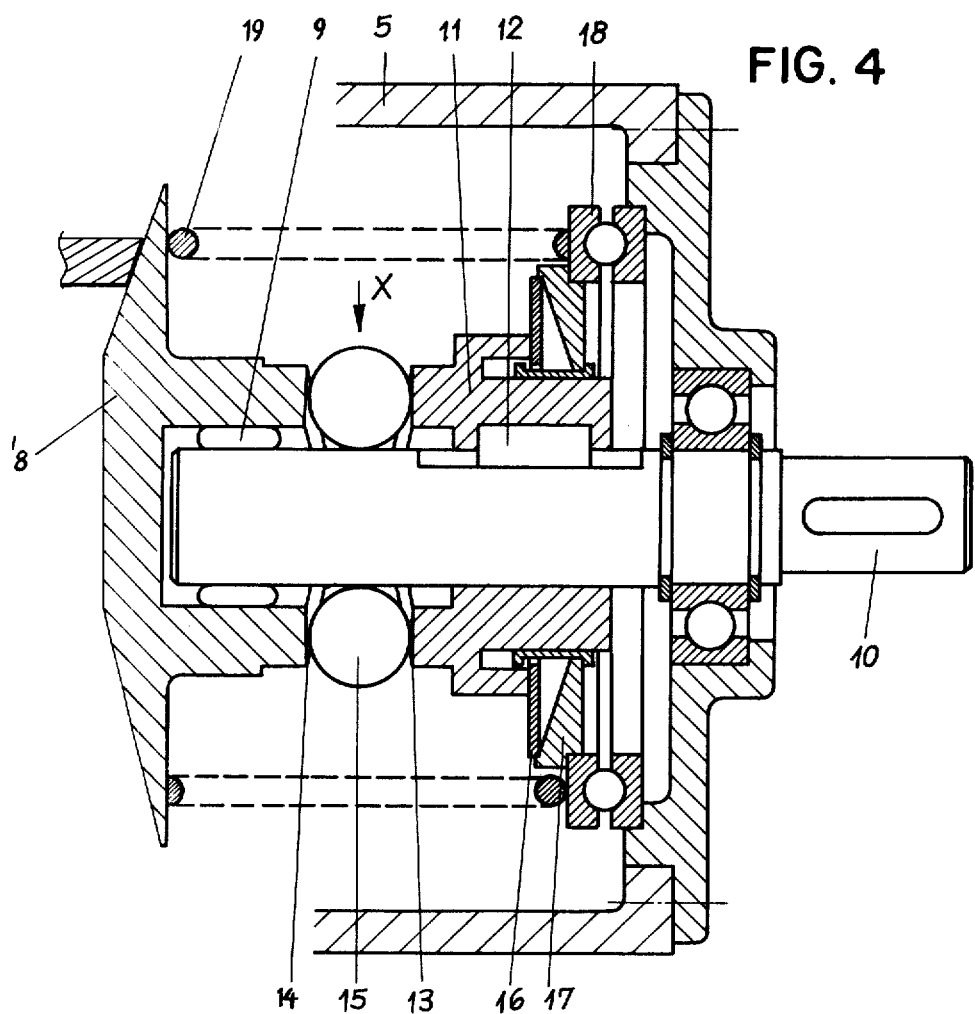
FIG. 4 shows a modification of the arrangement of FIG. 2 in which the only change is that the friction member constitutes a cone of a cone-pulley belt transmission.

A further application of the principle according to the invention is shown in FIG. 4, which discloses the use of a torque-dependent pressure means in combination with a pulley belt drive rather than a frictional transmission device as shown in FIG. 2. The torque-dependent pressure means is the same as that shown in FIG. 2, however, said device is utilized in combination with a pulley half 8' and corresponding belt.

In the structures described herein, the body which is shifted in dependence on the torque forms a part which also transmits rotational force between the driving and driven shafts.

What is claimed is:

1. In a device for generating variable pressure forces between first and second torque-transmitting friction elements in steplessly variable transmissions for connecting first and second shafts, means mounting the first friction element (8) on the first shaft for axial displacement with respect thereto, a member (11) mounted on the first shaft for rotation therewith and axial movement with respect thereto on the side of the first friction element remote from the second shaft, spring means (16) pressing the member towards the first friction element, the first friction element and the member having opposed cam faces and rolling members (15) engaged between said faces, said cam faces on both said first friction element and said member having projections extending axially therefrom engaging said rolling members when a rated moment is exceeded whereby to limit relative turning movement between the member and the first friction element.

2. In a device as claimed in claim 1, said spring means being a dished spring.

3. In a device according to claim 2, the spring being designed for a loading slightly above the rated moment.

4. In a device as claimed in claim 1, said first friction element being a flat disc.

5. In a device as claimed in claim 1, said rolling members transmitting turning forces between the first shaft and the first friction member.

6. In a device as claimed in claim 1, in which the first friction element is a cone.

* * * * *